US010427598B2

(12) United States Patent
Yamagata et al.

(10) Patent No.: US 10,427,598 B2
(45) Date of Patent: Oct. 1, 2019

(54) HEAD-UP DISPLAY DEVICE AND VEHICLE

(71) Applicant: PANASONIC INTELLECTUAL PROPERTY MANAGEMENT CO., LTD., Osaka (JP)

(72) Inventors: Michihiro Yamagata, Osaka (JP); Keiichi Matsuzaki, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 12 days.

(21) Appl. No.: 15/715,828

(22) Filed: Sep. 26, 2017

(65) Prior Publication Data
US 2018/0015876 A1 Jan. 18, 2018

Related U.S. Application Data

(63) Continuation of application No. PCT/JP2016/004831, filed on Nov. 8, 2016.

(30) Foreign Application Priority Data

Mar. 24, 2016 (JP) .................................. 2016-059371

(51) Int. Cl.
G02B 27/01 (2006.01)
G02B 26/08 (2006.01)
(Continued)

(52) U.S. Cl.
CPC ............. B60Q 3/12 (2017.02); B60K 35/00 (2013.01); B60Q 3/50 (2017.02); G02B 27/0101 (2013.01);
(Continued)

(58) Field of Classification Search
CPC ............. G02B 27/01; G02B 27/0101; G02B 27/0149; G02B 27/0179; G02B 2027/018;
(Continued)

(56) References Cited

U.S. PATENT DOCUMENTS 8,792,177 B2 * 7/2014 Nakamura ......... G02B 27/0101
359/630
10,120,188 B2 * 11/2018 Matsuzaki ............. G02B 27/01
(Continued)

FOREIGN PATENT DOCUMENTS

JP H03-028028 A 2/1991
JP H06-115381 A 4/1994
(Continued)

OTHER PUBLICATIONS

Written Opinion issued in World Intellectual Property Organization Application No. PCT/JP2016/004831, dated Dec. 7, 2017.
(Continued)

Primary Examiner — William C. Dowling
(74) Attorney, Agent, or Firm — Greenblum & Bernstein, P.L.C.

(57) ABSTRACT

A head-up display device includes a display element, a movable mirror, one or more first and second mirrors, and an movable unit. The display element emits light to form a display image. The movable mirror first reflects light emitted from the display element. The one or more first and second mirrors reflect light reflected off the movable mirror to project a virtual image. The movable unit adjusts a position of the movable mirror to adjust a projection distance of the virtual image. The movable mirror is disposed at a position such that light incident to the movable mirror is non-parallel to a normal of the movable mirror.

15 Claims, 11 Drawing Sheets

(51) Int. Cl.
  *B60Q 3/12*  (2017.01)
  *B60K 35/00* (2006.01)
  *B60Q 3/50*  (2017.01)
  *G03B 21/14* (2006.01)
  *G03B 21/28* (2006.01)
  *G03B 29/00* (2006.01)
  *H04N 9/31*  (2006.01)

(52) U.S. Cl.
  CPC ....... *G02B 27/0149* (2013.01); *G03B 21/142* (2013.01); *G03B 21/28* (2013.01); *G03B 29/00* (2013.01); *H04N 9/317* (2013.01); *H04N 9/3138* (2013.01); *B60K 2370/1529* (2019.05); *B60K 2370/23* (2019.05); *B60K 2370/334* (2019.05); *B60K 2370/736* (2019.05); *B60K 2370/744* (2019.05); *G02B 26/0816* (2013.01); *G02B 2027/014* (2013.01); *G02B 2027/0127* (2013.01); *G02B 2027/0154* (2013.01); *G02B 2027/0159* (2013.01); *G02B 2027/0185* (2013.01)

(58) Field of Classification Search
  CPC ...... G02B 2027/0123; G02B 2027/014; G02B 2027/0141; G02B 2027/0154; G02B 2027/0156; G02B 2027/0161; G02B 2027/0185; G02B 2027/0198
  See application file for complete search history.

(56) References Cited

U.S. PATENT DOCUMENTS

| | | | |
|---|---|---|---|
| 2009/0160736 A1* | 6/2009 | Shikita | G02B 27/0101 345/7 |
| 2013/0188259 A1 | 7/2013 | Nakamura et al. | |
| 2015/0061976 A1 | 3/2015 | Ferri | |
| 2017/0357088 A1 | 12/2017 | Matsuzaki et al. | |

FOREIGN PATENT DOCUMENTS

| | | |
|---|---|---|
| JP | 2009-150947 A | 7/2009 |
| JP | 2012-058689 A | 3/2012 |
| JP | 2016-117345 A | 6/2016 |

OTHER PUBLICATIONS

U.S. Appl. No. 15/704,454 to Satoshi Kuzuhara et al., which was filed on Sep. 14, 2017.
Search Report issued in International Bureau of WIPO Patent Application No. PCT/JP2016/004831, dated Jan. 17, 2017.

* cited by examiner

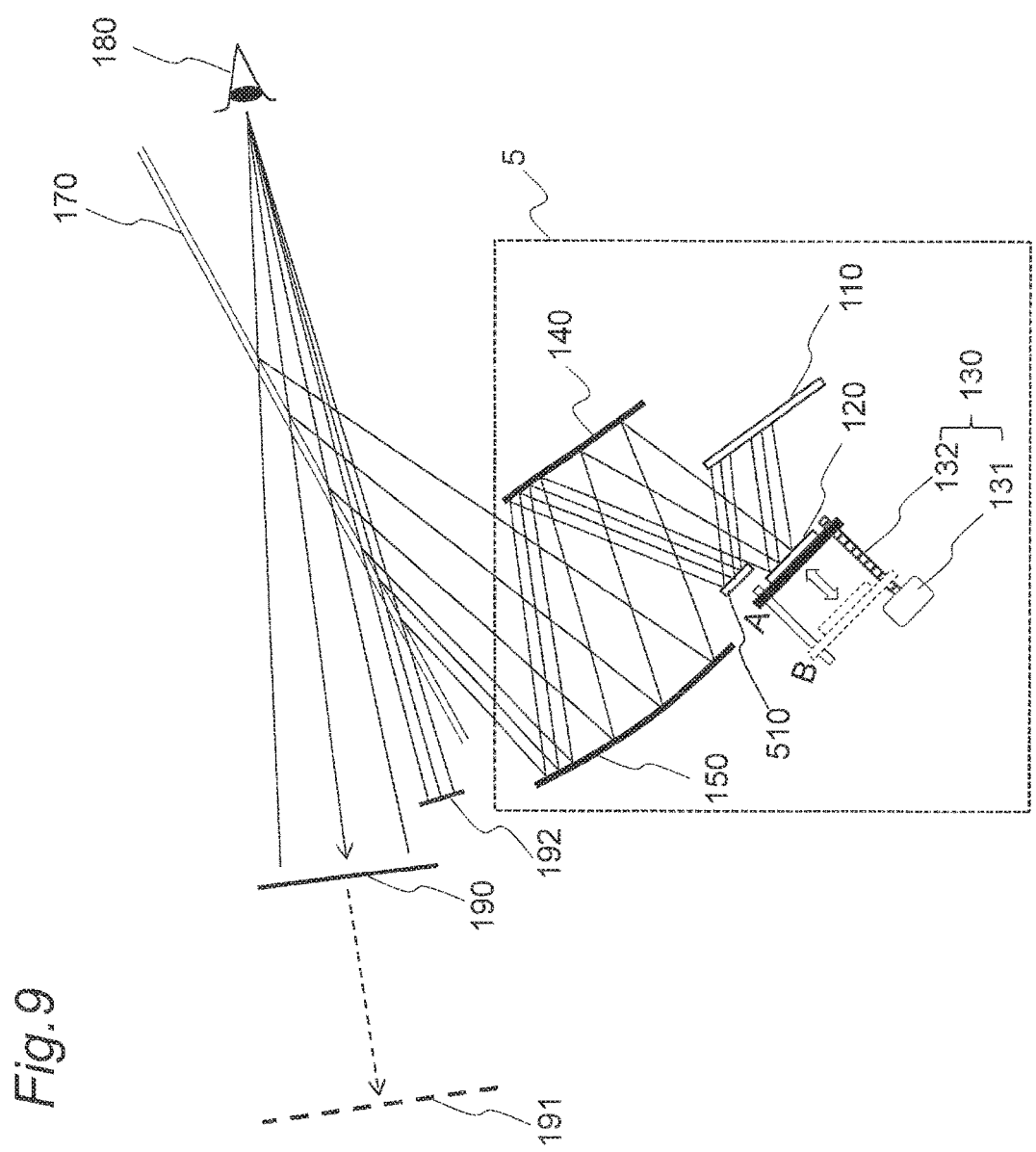

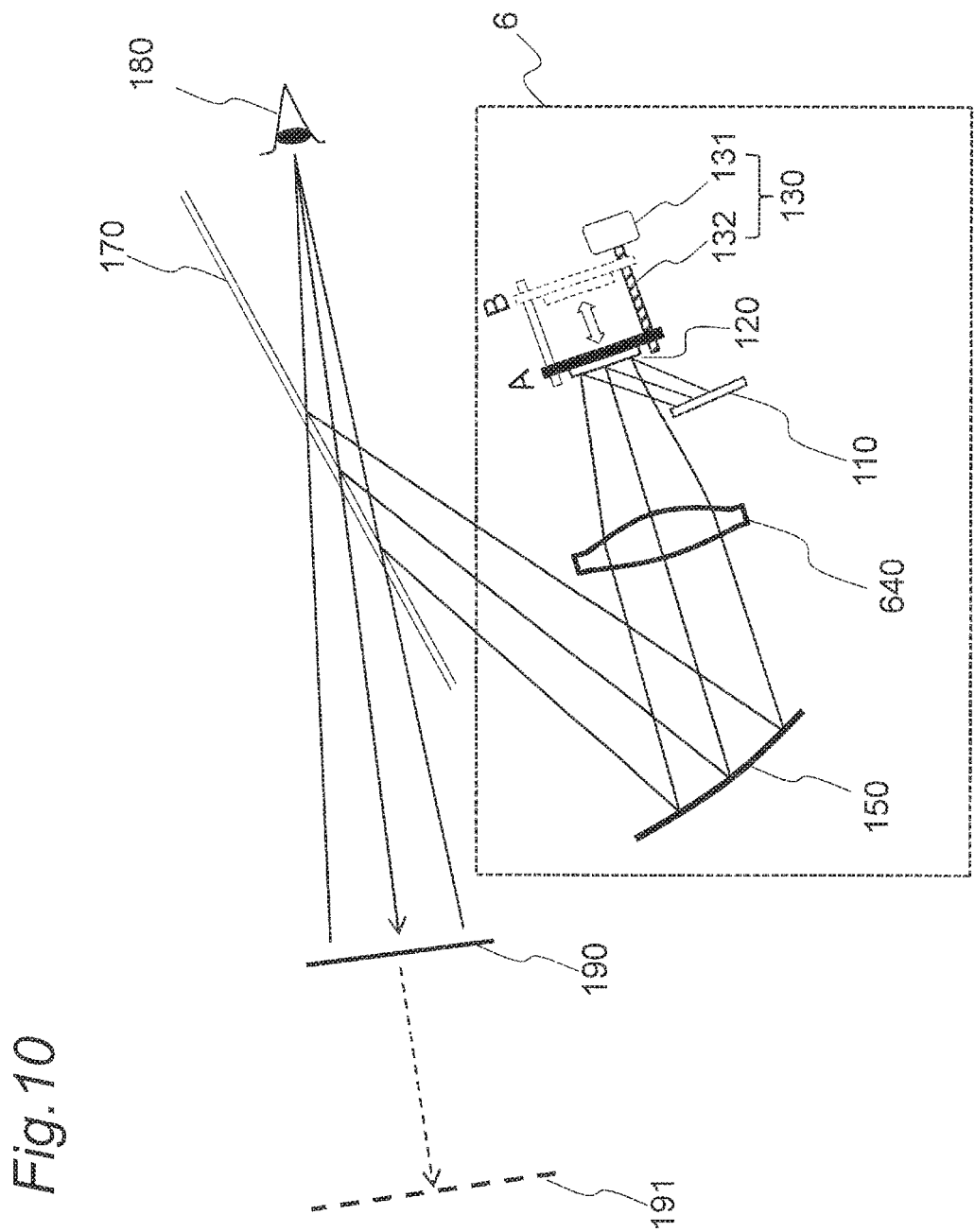

HEAD-UP DISPLAY DEVICE AND VEHICLE

TECHNICAL FIELD

The present disclosure relates to a vehicle display device, and more particularly to a head-up display device used in an automobile or the like.

BACKGROUND

There is known a head-up display device as an information display device of an automobile or the like.

Japanese Laid-Open Patent Publication No. H6-115381 discloses a head-up display device using a concave mirror as a turning mirror that can vary a position of a virtual image by varying a distance between a display as an object point and the concave mirror within a range allowing a virtual image point mirrored by the concave mirror to appear, in a manual manner or an automatic manner, or in a combination of these manners.

Japanese Laid-Open Patent Publication No. 2009-150947 discloses a vehicle head-up display device that includes a light source, a scan unit that scans light from the light source in a two-dimensional manner, a screen on which an image is formed by scanned light, and a projection unit that projects the image on the screen, and that varies a distance between the projection unit and the screen to vary a position of a virtual image projected.

SUMMARY

The present disclosure provides a head-up display device capable of varying a display distance of a projected virtual image at high speed.

A head-up display device in the present disclosure includes a display that emits light to form a display image, a first optical member that first reflects light emitted from the display, one or more second optical members that reflect light reflected off the first optical member or through which the light is transmitted to project a virtual image, an adjuster that adjusts a position of the first optical member to adjust a projection distance of the virtual image, wherein the first optical member is disposed at a position such that light incident to the first optical member is non-parallel to a normal of the first optical member.

According to the present disclosure, a head-up display device capable of varying a display distance of a projected virtual image at high speed can be provided.

BRIEF DESCRIPTION OF DRAWINGS

FIG. 9 illustrates an example of a structure of an optical system unit of a head-up display device in an embodiment 5 of the present disclosure; and FIG. 10 illustrates an example of a structure of an optical system unit of a head-up display device in an embodiment 6 of the present disclosure.

DESCRIPTION OF EMBODIMENT

Figure 1:
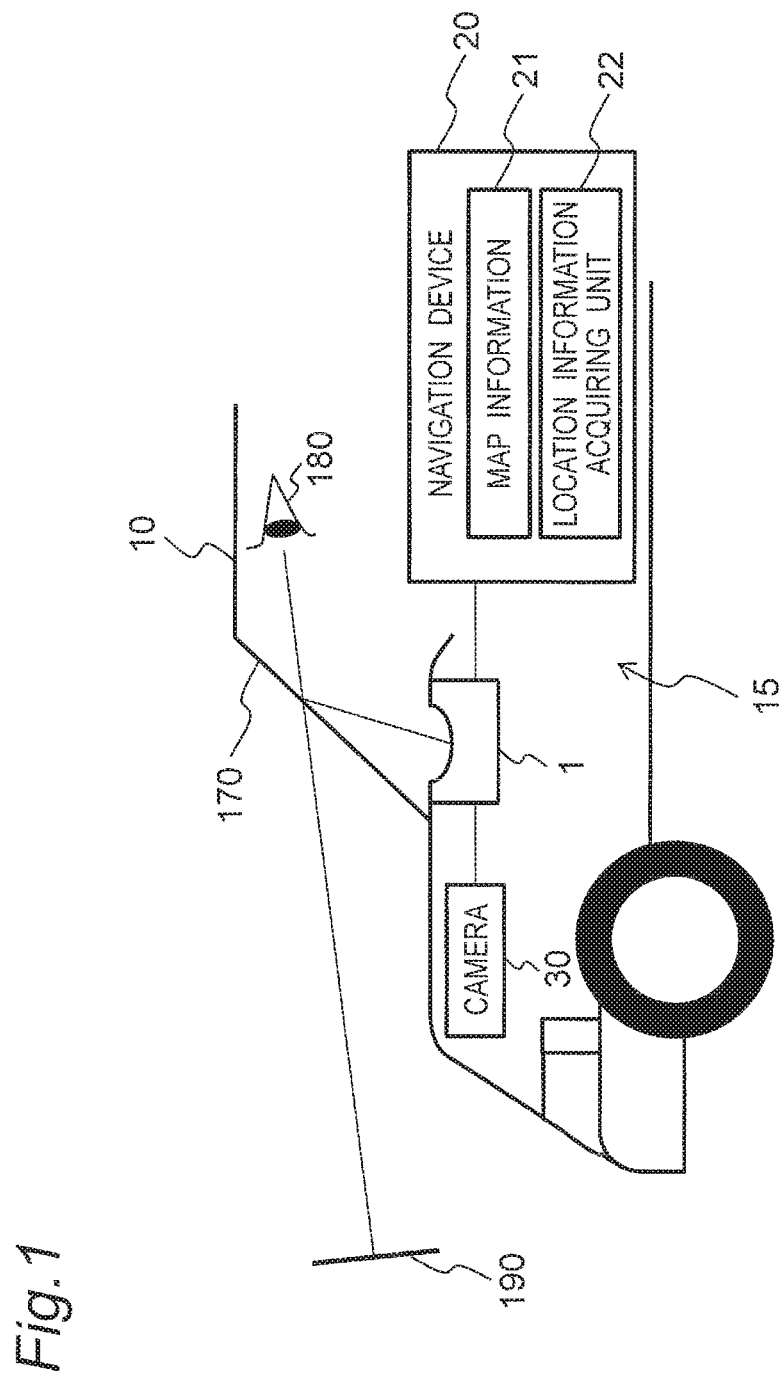
FIG. 1 illustrates an example of a structure of a vehicle provided with a navigation system using a head-up display device in an embodiment of the present disclosure.

Hereinafter, embodiments of the present invention will be described with reference to the attached drawings as appropriate. Detailed description more than necessary may be eliminated. For example, detailed description of a well-known matter and duplicated description of substantially identical structure may be eliminated. This allows the description below to avoid becoming unnecessarily lengthy for easy understanding by a person skilled in the art. The inventors provide the accompanying drawings and the description below to allow a person skilled in the art to sufficiently understand the present disclosure, so that there is no intention to limit a subject of the description to the scope of claims.

In all the drawings, an element having a common function is designated by the same reference numeral, and duplicated description on an element that has been described is eliminated.

Embodiment 1

[1-1. Structure]
[1-1-1. Structure of Vehicle]

FIG. 1 illustrates an example of a structure of a vehicle provided with a navigation system using a head-up display device in an embodiment 1 of the present disclosure. FIG. 1 illustrates a vehicle 10 that includes a navigation system 15 and a camera 30. The navigation system 15 includes a head-up display device 1 and a navigation device 20.

The navigation device 20 provides route information to a predetermined destination to a driver to guide the route. The navigation device 20 includes a built-in memory in which map information 21 is stored. The navigation device 20 also includes a location information acquiring unit 22 such as a global positioning system (GPS) to acquire location information on the vehicle itself, and stores the information in the built-in memory.

The camera 30 takes a picture ahead of the vehicle itself, for example, to create image information.

The head-up display device 1 projects image light on a front glass 170 of the vehicle to project a virtual image 190 ahead of the front glass 170 with respect to driver's eyes 180. The head-up display device 1 sets a projection position of the virtual image 190 on the basis of location information on the vehicle or map information from the navigation device 20, or image information from the camera 30. The projection position described above principally designates a distance from a driver to the virtual image 190.

[1-1-2. Schematic Structure of Head-up Display Device]

Figure 2:
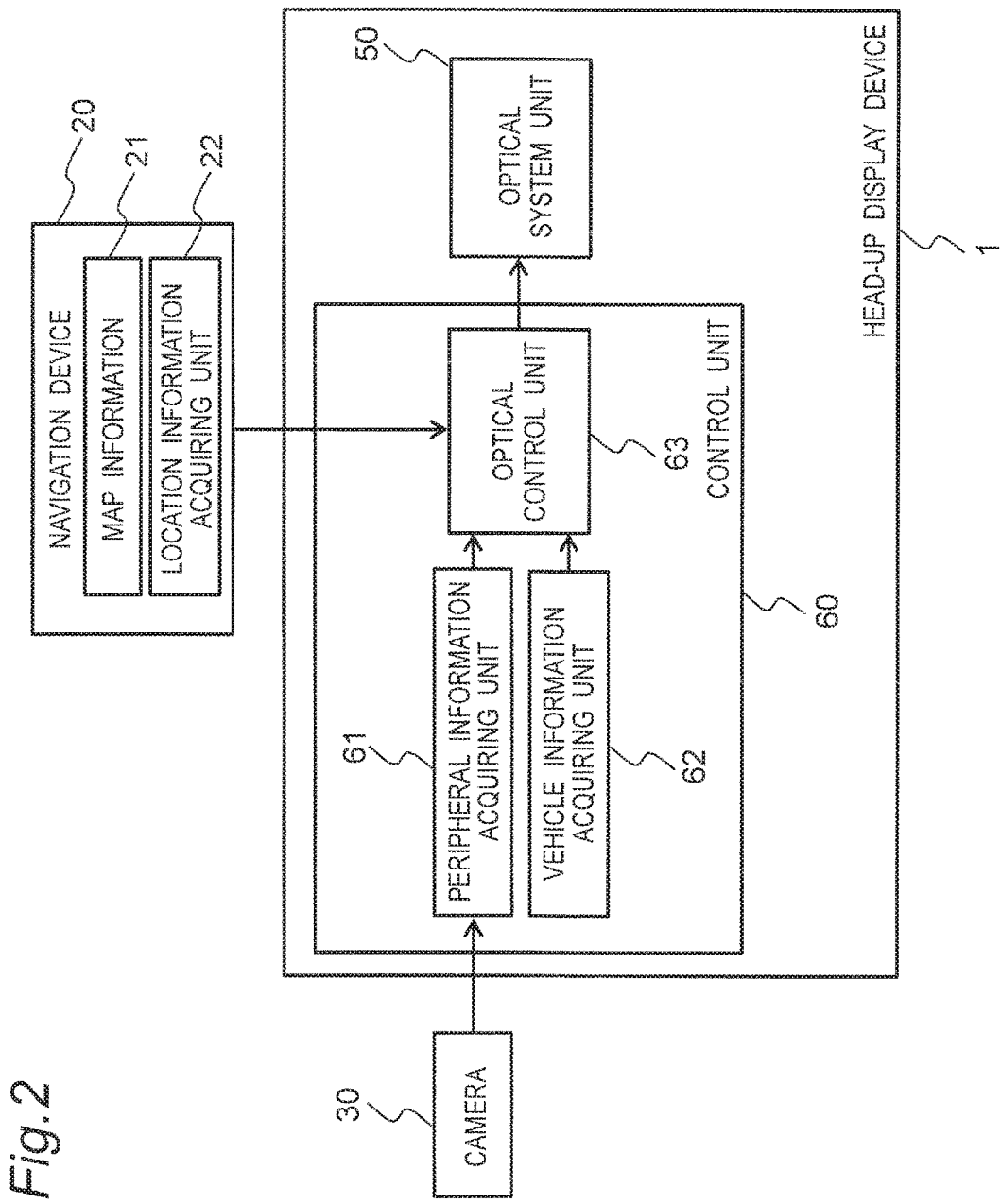
FIG. 2 is a block diagram illustrating an example of a structure of a head-up display device 1 in an embodiment 1 of the present disclosure.

FIG. 2 is a block diagram illustrating an example of a structure of a head-up display device 1 in the embodiment 1 of the present disclosure.

The head-up display device 1 includes an optical system unit 50 and a control unit 60.

The control unit 60 is formed of a CPU or an MPU, for example, to execute a program stored in a memory, so that various functions are achieved. The control unit 60 may be formed of a hardware circuit (e.g. ASIC and FPGA), such as exclusively designed electronic circuit, and an electronic circuit that can be reconfigured. Functions of the control unit 60 may be achieved by cooperation of hardware and software, or may be achieved by only hardware (electronic circuit).

The control unit 60 includes a peripheral information acquiring unit 61, a vehicle information acquiring unit 62, and an optical control unit 63.

The peripheral information acquiring unit 61 detects a peripheral building and scene, and an object on a road surface by analyzing image information ahead of a vehicle from the camera 30 to acquire information on a distance from the vehicle itself to the building or the object. The object on a road surface is an intersection, for example.

The vehicle information acquiring unit 62 acquires speed information from various sensors of the vehicle.

The optical control unit 63 extracts a peripheral building and scene, and an object on a road surface on the basis of map information from the navigation device 20. The optical control unit 63 acquires information on a distance from the vehicle to the building or the object on the basis of location information on the vehicle and map information from the navigation device 20. Then, the optical control unit 63 causes the optical system unit 50 to project a virtual image 190 such that the virtual image 190 is positioned near the building or the object, on the basis of the acquired information on the distance. This enables facility information to be projected near a building or enables route guidance information to be projected near an intersection, as information of the navigation device 20, for example.

Alternatively, the optical control unit 63 may cause the optical system unit 50 to project a virtual image 190 such that the virtual image 190 is positioned near a building or an object on the basis of information on a distance from the vehicle itself to the building or the object from the peripheral information acquiring unit 61.

In addition, the optical control unit 63 may set a projection position of the virtual image 190 on the basis of speed information on the vehicle from the vehicle information acquiring unit 62. For example, a projection position of the virtual image 190 may be set such that the virtual image is projected far when a vehicle travels at high speed and a driver's eye point is on a far side, and that the virtual image is projected closely when the vehicle travels at low speed and the driver's eye point is on a near side.

The optical system unit 50 includes an optical system for projecting a virtual image. The optical system unit 50 of the head-up display device 1 will be described below. In the head-up display device 1 illustrated in FIG. 3, only the optical system unit 50 is illustrated and the control unit 60 is eliminated (the same applies to embodiments 2 to 6).

[1-1-3. Structure of Head-up Display Device (Optical System Unit)]

Figure 3:
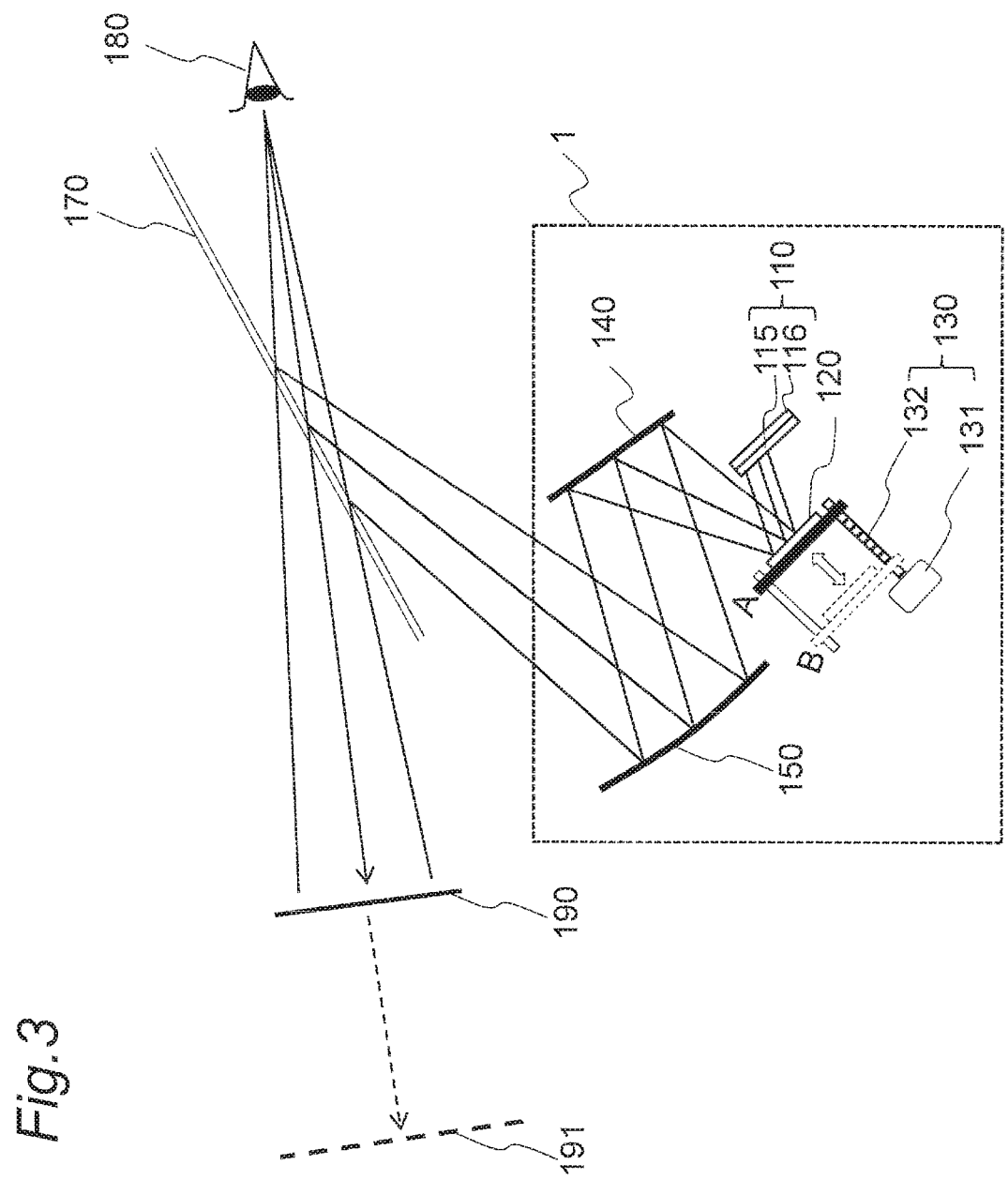
FIG. 3 illustrates an example of a structure of an optical system unit of the head-up display device in the embodiment 1 of the present disclosure.

FIG. 3 illustrates an example of a structure of the optical system unit of the head-up display device 1 in the embodiment 1 of the present disclosure.

The head-up display device 1 of the present embodiment 1 includes a display element 110 serving as a display, a movable mirror 120 serving as a first optical member, a movable unit 130 serving as an adjuster, and a first mirror 140 and a second mirror 150 each serving as a second optical member. The movable unit 130 includes a motor 131, and a feed screw 132.

The display element 110 emits light (hereinafter referred to as display light) that forms a display image such as driving information and route information, which are displayed for a driver. The display element 110 is a liquid crystal display module, for example, and includes a liquid crystal display panel 115, and a backlight 116. The display element 110 may include a liquid crystal display panel driving circuit board, a light guide plate, a lens, a diffuser plate, a backlight heat sink, and the like.

The movable mirror 120 reflects display light emitted from the display element 110 toward the first mirror 140. In the embodiment 1, the movable mirror 120 is a substantially plane mirror, for example.

The movable unit 130 adjusts a position of the movable mirror 120. As illustrated in FIG. 3, the movable unit 130 allows the movable mirror 120 to move parallel to itself between a position A and a position B.

The motor 131 of the movable unit 130 is controlled by the control unit 60 on the basis of a detection signal from each of the various sensors of the vehicle, described above, and information for driving output from the navigation device 20, for example. The feed screw 132 is rotationally driven by the motor 131. The movable unit 130 adjusts a position of the movable mirror 120 by rotating the feed screw 132.

The first mirror 140 reflects display light reflected off the movable mirror 120 toward the second mirror 150. The first mirror 140 is a convex mirror, for example.

The second mirror 150 reflects display light reflected off the first mirror 140 and condenses the display light to emit the display light toward a front glass 170. The second mirror 150 is a concave mirror, for example.

[1-2. Operation]

[1-2-1. General Operation]

Operation of the head-up display device 1 in the embodiment 1 will be described.

Display light emitted from the display element 110 is reflected off the movable mirror 120, and then is reflected off the first mirror 140 and the second mirror 150 and is condensed. The condensed light is reflected off the front glass 170 of a vehicle to reach driver's eyes 180.

The driver's eyes 180 visually identify a display image displayed in the display element 110 far ahead of the front glass 170 as a virtual image 190.

A distance from the driver's eyes 180 to the virtual image 190 (hereinafter referred to as a virtual image distance) can be changed when the movable unit 130 allows the movable mirror 120 to move parallel to itself between the position A and the position B. The movable unit 130 can change a display position of the virtual image 190, between the virtual image 190 and the virtual image 191, for example.

A position of the movable mirror 120 is set for AR-HUD application on the basis of travel location information on a vehicle, map information 21 of the navigation device 20, or information from the camera 30, the peripheral information acquiring unit 61, and the like, as described above, for example, in accordance with a distance from a peripheral building and scene, and an object on a road surface, to a vehicle.

In addition, a position of the movable mirror 120 may be set on the basis of vehicle speed information from various sensors of the vehicle, as described above. For example, a position of the movable mirror 120 may be set such that the virtual image is projected far when a vehicle travels at high speed and a driver's eye point is on a far side, and that the virtual image is projected closely when the vehicle travels at low speed and a driver's eye point is on a near side. This enables movement of a driver's eye point to be reduced.

Further, a virtual image may be appropriately adjusted to a distance allowing a driver to easily view the virtual image, depending on driver's own physiological factors such as eyesight, or preference such as a driving posture.

[1-2-2. Display Area in Display Element 110]

Operation of the head-up display device 1 in the embodiment 1 will be described.

Figure 4A:
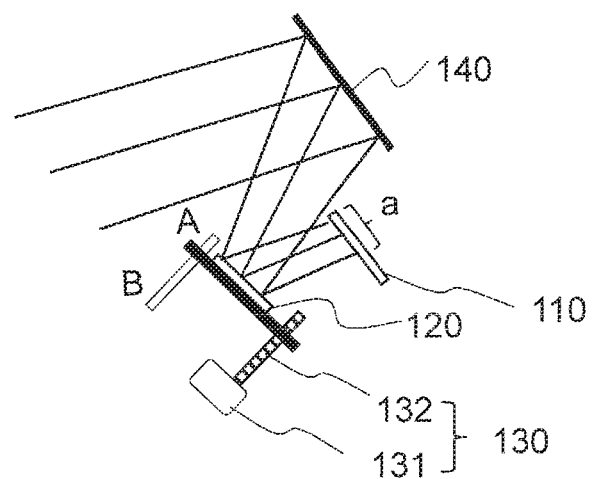
FIG. 4A illustrates a relationship between a position of a movable mirror and a display area in a display element in the embodiment 1 of the present disclosure.
Figure 4B:
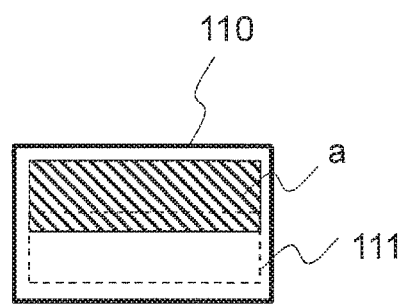
FIG. 4B illustrates a relationship between a position of the movable mirror and a display area in the display element in the embodiment 1 of the present disclosure.
Figure 4C:
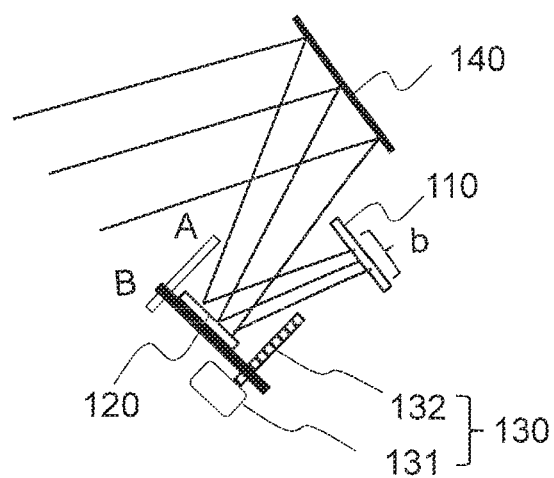
FIG. 4C illustrates a relationship between a position of the movable mirror and a display area in the display element in the embodiment 1 of the present disclosure.
Figure 4D:
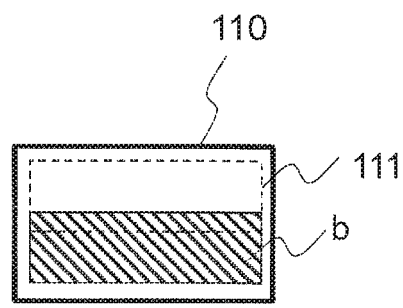
FIG. 4D illustrates a relationship between a position of the movable mirror and a display area in the display element in the embodiment 1 of the present disclosure.

FIGS. 4A to 4D each illustrate a relationship between a position of the movable mirror 120 and a display area in the display element 110 in the embodiment 1 of the present disclosure. In FIGS. 4B and 4D, a broken line area 111 in the display element 110 allows a display image to be displayed. In the present disclosure, an area in the area 111, where a display image is actually displayed, is referred to as a "display area".

Display light emitted from the display element 110 is incident to the movable mirror 120 at an angle. A display area in the display element 110 may be changed in accordance with a position of the movable mirror 120 to maintain an incident position to the first mirror 140 at almost the same position when the movable mirror 120 is moved by the movable unit 130. Then, the control unit 60 of the head-up display device 1 controls a display area of a display image in the display element 110 according to location information on the movable mirror 120 received from the movable unit 130. The display element 110 changes a display position of a display image under control by the control unit 60. Specifically, the display element 110 changes an illumination range of illumination light by using the backlight 116 according to location information on the movable mirror. Operation as described above enables illumination to be efficient and unnecessary stray light to be prevented from occurring.

For example, FIG. 4A illustrates the movable mirror 120 that is set at a position A by the movable unit 130. In this case, a display area is set to an area "a". FIG. 4B illustrates the display element 110 in the case of FIG. 4A as viewed from its front face. As illustrated in FIG. 4B, a display area is set to an area "a" on an upper side of the area 111 in the display element 110.

FIG. 4C illustrates the movable mirror 120 that is set at a position B by the movable unit 130. In this case, a display area is set to an area "b". FIG. 4D illustrates the display element 110 in the case of FIG. 4B as viewed from its front face. As illustrated in FIG. 4D, a display area is set to an area "b" on a lower side of the area 111 in the display element 110.

[1-2-2. Position of Movable Mirror and Display Area]

Figure 5:
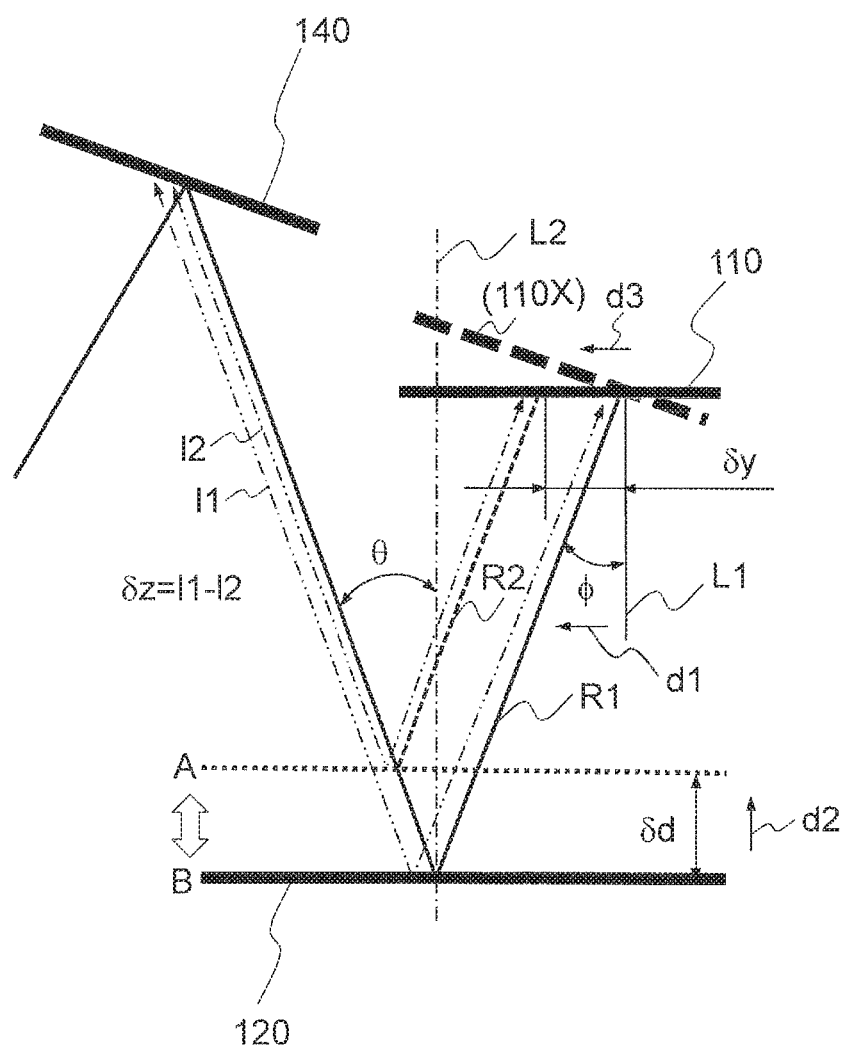
FIG. 5 is an illustration to describe a relationship between a position of the movable mirror and a display area in the display element in the embodiment 1 of the present disclosure.

With reference to FIG. 5, a relationship between a position of the movable mirror 120 and a display area in the display element 110 will be quantitatively described below.

FIG. 5 is an illustration to describe a relationship between a position of the movable mirror 120 and a display area in the display element 110 in the embodiment 1 of the present disclosure.

FIG. 5 illustrates a state where the movable mirror 120 is positioned at a position B. FIG. 5 illustrates an optical path of a light beam R1 in a beam of light at a central portion of a virtual image at the center of a visual field, the light beam R1 being reflected off the first mirror 140 at a substantially central portion thereof. The light beam R1 emitted from the display element 110 at an angle φ to a normal L1 of the display element 110 is incident to the movable mirror 120 at an incident angle θ, and is reflected off the movable mirror 120. That is, the normal L2 of the movable mirror 120 and the light beam R1 form the angle θ.

When the movable mirror 120 moves parallel to itself to the position A from the position B, a light beam emitted from the display element 110, passing through the same optical path as that of the light beam R1 after being reflected off the movable mirror 120, is a light beam R2 indicated by a broken line. When a moving distance of the movable mirror 120 is indicated as δd, a distance δy between an emission position of the light beam R1 and an emission position of the light beam R2 in the display element 110 can be expressed by Expression 1.

$$\delta y = \frac{2\delta d \sin\theta}{\cos\phi} \qquad \text{[Expression 1]}$$

That is, when a display area of a display image in the display element 110 is moved by the amount δy based on Expression 1 with respect to the amount δd of parallel displacement of the movable mirror 120, an optical path of a light beam after being reflected off the first mirror 140 at the image center can be uniformly maintained regardless of a position of the movable mirror 120. Thus, even if a projection distance of a virtual image is changed, the virtual image is projected in the same direction as viewed form driver's eyes.

When a virtual image formed by the head-up display device 1 is observed while being matched to a background, an angle (depression angle) from driver's eyes to the background tends to increase in a close-range view, and the depression angle tends to decrease in a distant view. In such a case, a projection direction of a virtual image needs to be adjusted in accordance with a difference in a depression angle. A projection direction of a virtual image can be adjusted by appropriately increasing or reducing a shift amount of a display area indicated by the amount δy of Expression 1 by an amount required for adjustment of the projection direction of the virtual image.

While a projection distance of a virtual image changes as a light path length of display light from the display element 110 to the first mirror 140 changes, a variation δz of the light path length of display light from the display element 110 to the first mirror 140 is expressed by Expression 2.

$$\delta z = 2\delta d(\cos\theta + \sin\theta \tan\phi) \qquad \text{[Expression 2]}$$

In FIG. 5, where a light path length from the display element 110 to first mirror 140 when the movable mirror 120 is positioned at the position B is indicated as l1, and a light path length from the display element 110 to first mirror 140 when the movable mirror 120 is positioned at the position A is indicated as l2, a difference between the light path length l1 and the light path length l2 corresponds to a variation δz of a light path length.

As is evident from Expression 2, when the amounts of θ and are suitably set, a variation δz of a distance from the display element 110 to the first mirror 140 can be made larger than a moving distance δd of the movable mirror 120. This shows that a projection distance can be adjusted within a moving range less than that in a case when the display element 110 itself is directly moved parallel to itself. That is, the movable unit 130 can be formed in a smaller size as a whole, and thus is more preferable as a device.

Specifically, as an absolute value of θ decreases, a variation δz of a distance from the display element 110 to the first mirror 140 with respect to a moving distance δd of the movable mirror 120 can be increased, and as an absolute value of θ increases, effect of θ decreases. Substantially, when θ increases to an angle larger than 50 degrees, a moving distance increases too much, and thus is unfavorable. When θ is zero, light is vertically incident to the movable mirror 120. In this case, light reflected off the movable mirror 120 returns to the display element 110 instead of traveling toward the first mirror 140. That is, θ should not be zero, so that θ is preferably an angle of at least five degrees or more, and is more preferably an angle of ten degrees or more.

When light is incident to the head-up display device 1 from the outside, the incident light reflected off the display element 110 may be incident into driver's eyes. This phenomenon occurs when a display element 110X designed to emit light in a normal direction of the display element is used and disposed such that light from the display element 110X forms a virtual image (refer to the broken line of FIG. 5).

To prevent the phenomenon, the display element 110 may be formed as follows. That is, the display element 110 is designed to emit a light beam R1 in a predetermined direction d1 inclined from the normal L1 of the display element 110, and then is disposed at an angle such that the light beam R1 from the display element 110 forms a virtual image. The predetermined direction d1 in which the light beam R1 is inclined is designed to be identical to a direction d3 (on the area "a" side of FIG. 4B) in which a display position of an image in the display element 110 is shifted when the movable mirror 120 is moved so as to reduce a display distance of the virtual image (refer to the direction d2 of FIG. 5). In other words, the display element 110 is disposed at an angle such that a portion in the display element 110 in the direction d3 becomes closer to the movable mirror 120 as compared with the case where the display element 110X is disposed as described above (refer to the broken line of FIG. 5). When an absolute value of an angle φ of the light beam R1 inclined from the normal L1 is set large in this placement, incident light from the outside can be prevented from being incident into driver's eyes. As is evident from Expression 2 and FIG. 5A, this placement enables a variation δz of a distance from the display element 110 to the first mirror 140 to be made larger than a moving distance δd of the movable mirror 120.

[1-3. Summary]

As described above, in the present embodiment, the head-up display device 1 includes the display element 110, the movable mirror 120, the first and second mirrors 140 and 150, and the movable unit 130. The display element 110 emits light to form a display image. The movable mirror 120 first reflects light emitted from the display element 110. The first and second mirrors 140 and 150 each reflect light reflected off the movable mirror 120 to project a virtual image 190. The movable unit 130 adjusts a position of the movable mirror 120 to adjust a projection distance of the virtual image 190. The movable mirror 120 is disposed at a position such that light that is incident to the movable mirror 120 and is reflected off the movable mirror 120 is non-parallel to a normal L2 of the movable mirror 120.

In the head-up display device 1, the movable mirror 120 is disposed at a position so as to receive light emitted from the display element 110 and to reflect the light non-parallel to a normal of the display element 110. The light reflected off the movable mirror 120 is reflected off the first mirror 140 and the second mirror 150, and then is reflected off a front glass 170 to project a virtual image on driver's eyes. The movable unit 130 can change a position of the movable mirror 120. This structure allows the movable unit 130 to move the movable mirror 120, so that a display position of the virtual image 190 can be adjusted.

Conventionally, there is known a head-up display device that adjusts a position of a display element to adjust a projection distance of a virtual image. The display element has a high hearing value, so that a heat sink needs to be provided, and thus is heavy. Thus, it is difficult to move the display element at high speed. As a result, it is difficult to change a projection distance of the virtual image 190 at high speed.

In contrast, in the present embodiment, the movable mirror 120 lighter than the display element 110 provided with a heat sink is moved, so that the movable mirror 120 can be moved at relatively high speed and in a stable manner. Thus, a projection distance of the virtual image 190 can be changed at relatively high speed and in a stable manner.

The movable mirror 120 is an optical member that first reflects light with a relatively small beam diameter emitted from the display element. Thus, the movable mirror 120 is relatively small, and can be moved at relatively high speed and in a stable manner. As a result, a projection distance of the virtual image 190 can be changed at relatively high speed and in a stable manner.

Accordingly, it is possible to provide a head-up display device with a small-sized structure, capable of changing a display distance of a projected virtual image, at relatively high speed and in a stable manner.

In the present embodiment, while a placement order of mirrors each of which reflects display light emitted from the display element 110 is described as the order as follows: the movable mirror 120, the first mirror 140, and the second mirror 150, the placement order is not necessarily limited to the order above. For example, the movable mirror 120 may be disposed between the first mirror 140 and the second mirror 150. A beam of light emitted from the display element 110 has a width that increases every time when the beam of light is reflected off a mirror. Thus, when the movable mirror 120 is used as a mirror that first reflects a beam of light emitted from the display element 110, the movable mirror 120 can be reduced in area. This enables the movable unit 130 to be reduced in size and driving force required for the motor 131 to be reduced, and thus is preferable to design an apparatus.

In the present embodiment, while there is described a virtual image projecting optical system using two mirrors including a spherical convex mirror serving as the first mirror 140, and a spherical concave mirror serving as the second mirror 150, the system is not limited to the structure described above. Each of the mirrors may be a spherical concave mirror, a spherical convex mirror, an aspherical concave mirror, an aspherical convex mirror, or a free-form surface mirror.

In addition, the number of mirrors constituting the virtual image projecting optical system is not limited to two, and may be one, or three or more.

Embodiment 2

[2-1. Structure]

Figure 6:
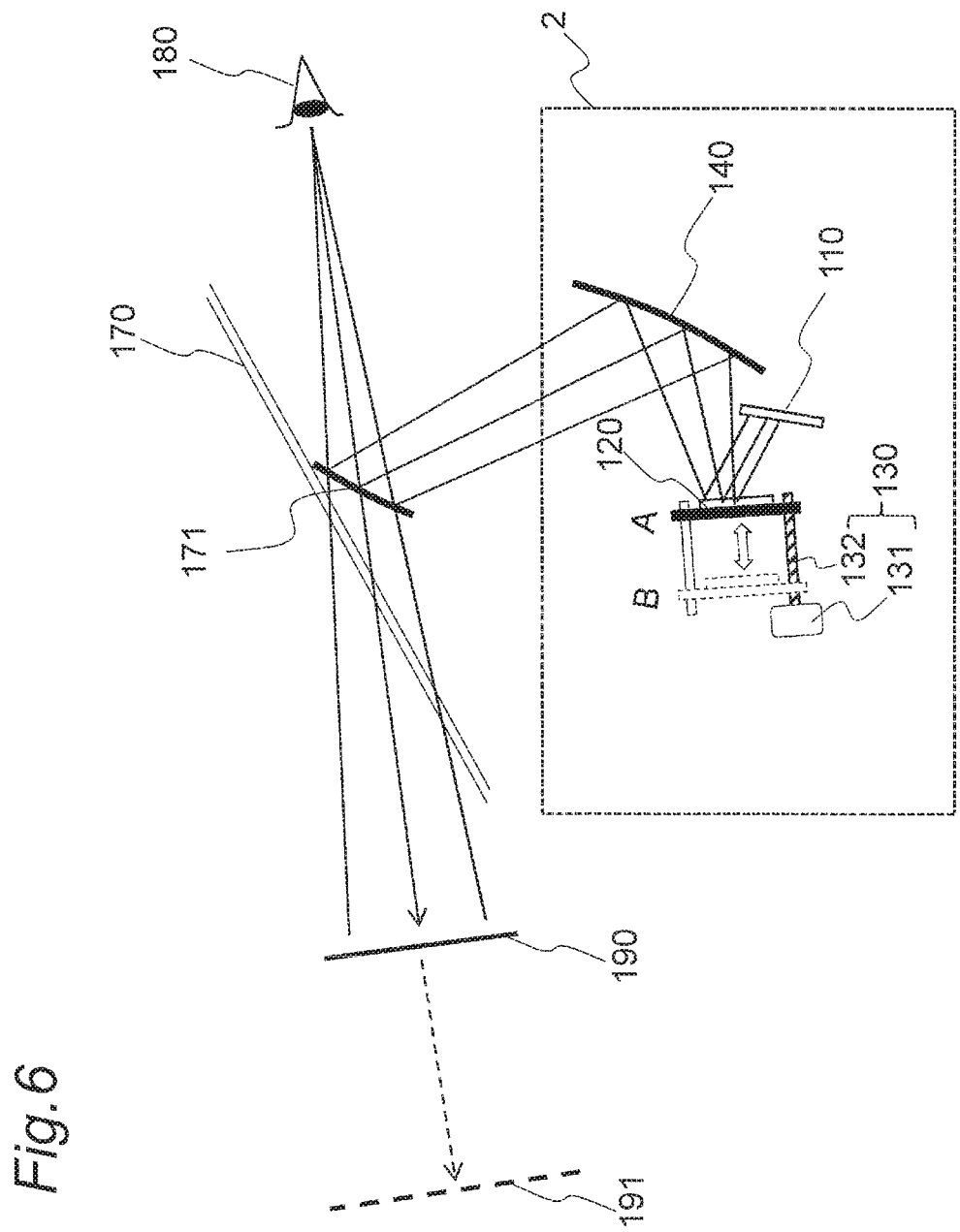
FIG. 6 illustrates an example of a structure of an optical system unit of the head-up display device in an embodiment 2 of the present disclosure.

FIG. 6 illustrates an example of a structure of a head-up display device 2 in an embodiment 2 of the present disclosure. The head-up display device 2 projects display light on a combiner 171 provided near a front glass 170 of a vehicle.

The head-up display device 2 includes a display element 110 serving as a display, a movable mirror 120 serving as a first optical member, a movable unit 130, and a first mirror 140 serving as a second optical member. In FIG. 6, a component performing the same operation as that performed by a component of FIG. 3 is designated as the same reference numeral to eliminate duplicated description. The head-up display device 1 of the embodiment 1 reflects display light off the front glass 170. In contrast, the head-up display device 2 of the present embodiment has the same structure and performs the same operation as those of the embodiment 1, except that it does not include a second mirror 150, and display light is reflected off the combiner 171.

[2-2. Operation]

The combiner 171 is an optical element that reflects a part of incident light and allows a part of the incident light to be transmitted therethrough. Driver's eyes 180 can visually identify an image of a front scene transmitted through the combiner 171 and a virtual image 190 reflected off the combiner 171. The combiner 171 is formed as a spherical concave surface, an aspherical concave surface, or a free-form concave surface.

In the present embodiment, display light from the display element 110 is reflected off the movable mirror 120 and the first mirror 140, and then is reflected off the combiner 171 to reach the driver's eyes 180.

[2-3. Summary]

The head-up display device 2 of the embodiment 2 reflects display light emitted from the display element 110 off the movable mirror 120 and the first mirror 140 toward the combiner 171 to project a virtual image. The movable unit 130 can change a position of the movable mirror 120.

This structure allows the movable unit 130 to move the movable mirror 120, so that a display position of the virtual image 190 can be adjusted.

Accordingly, it is possible to provide a head-up display device with a small-sized structure, capable of changing a display distance of a projected virtual image, at relatively high speed and in a stable manner.

Embodiment 3

[3-1. Structure]

Figure 7:
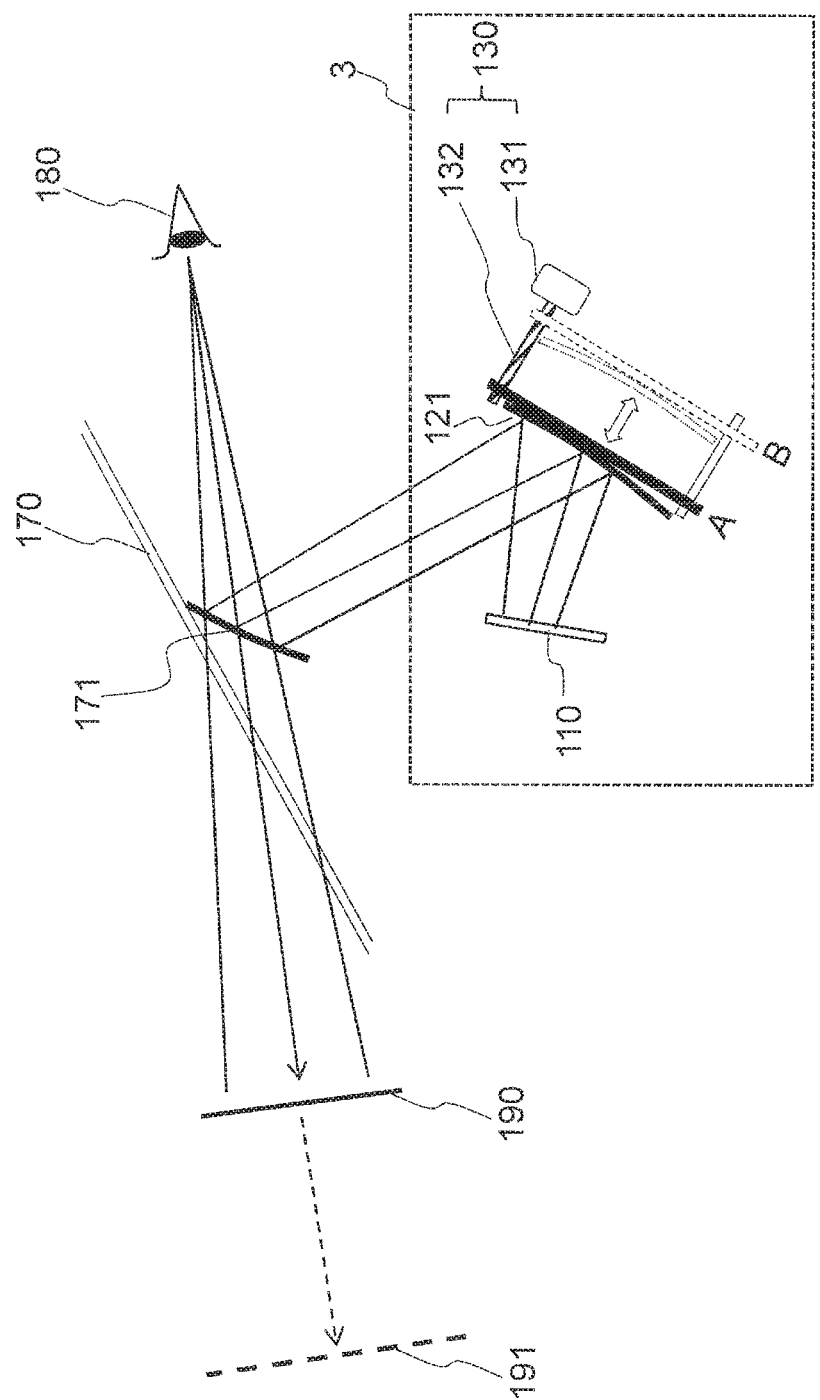
FIG. 7 illustrates an example of a structure of an optical system unit of the head-up display device in an embodiment 3 of the present disclosure.

FIG. 7 illustrates an example of a structure of an optical system of a head-up display device 3 in an embodiment 3 of the present disclosure. The head-up display device 3 projects light on a combiner 171 provided near a front glass 170 of a vehicle.

The head-up display device 3 includes a display element 110 serving as a display, a movable mirror 121 serving as a first optical member, and a movable unit 130. In FIG. 7, a component performing the same operation as that performed by a component of each of FIGS. 3 and 6 is designated as the same reference numeral to eliminate duplicated description.

The movable mirror 121 of the present embodiment has a free-form surface. The movable mirror 121 is formed in a free-form surface shape, so that a simple optical system is fabricated by eliminating a first mirror 140 used in each of the prior embodiments.

[3-2. Operation]

In the present embodiment, display light from the display element 110 is reflected off the movable mirror 121, and then is reflected off the combiner 171 to reach driver's eyes 180.

[3-3. Summary]

The head-up display device 3 of the embodiment 3 includes the display element 110 and the movable mirror 121 having a free-form surface, and emits display light toward the combiner 171. The movable mirror 121 can be changed in position by the movable unit 130.

This structure allows the movable unit 130 to move the movable mirror 121, so that a display position of the virtual image 190 can be adjusted. The movable mirror 121 is formed in a free-form surface shape, so that an optical system can be simplified.

Accordingly, it is possible to provide a head-up display device with a small-sized structure, capable of changing a display distance of a projected virtual image, at relatively high speed and in a stable manner.

Forming a movable mirror in a free-form surface shape is also effective in a structure in which light is reflected off a front glass 170 as described in the embodiment 1. When the movable mirror 120 is formed in a free-form surface shape in the structure described in the embodiment 1, a simpler optical structure can be fabricated by eliminating the first mirror 140. Alternatively, when the first mirror 140 is not eliminated, a virtual image of high picture quality can be presented.

The movable mirror 121 may be an aspherical mirror or a spherical mirror.

Embodiment 4

[4-1. Structure]

Figure 8:
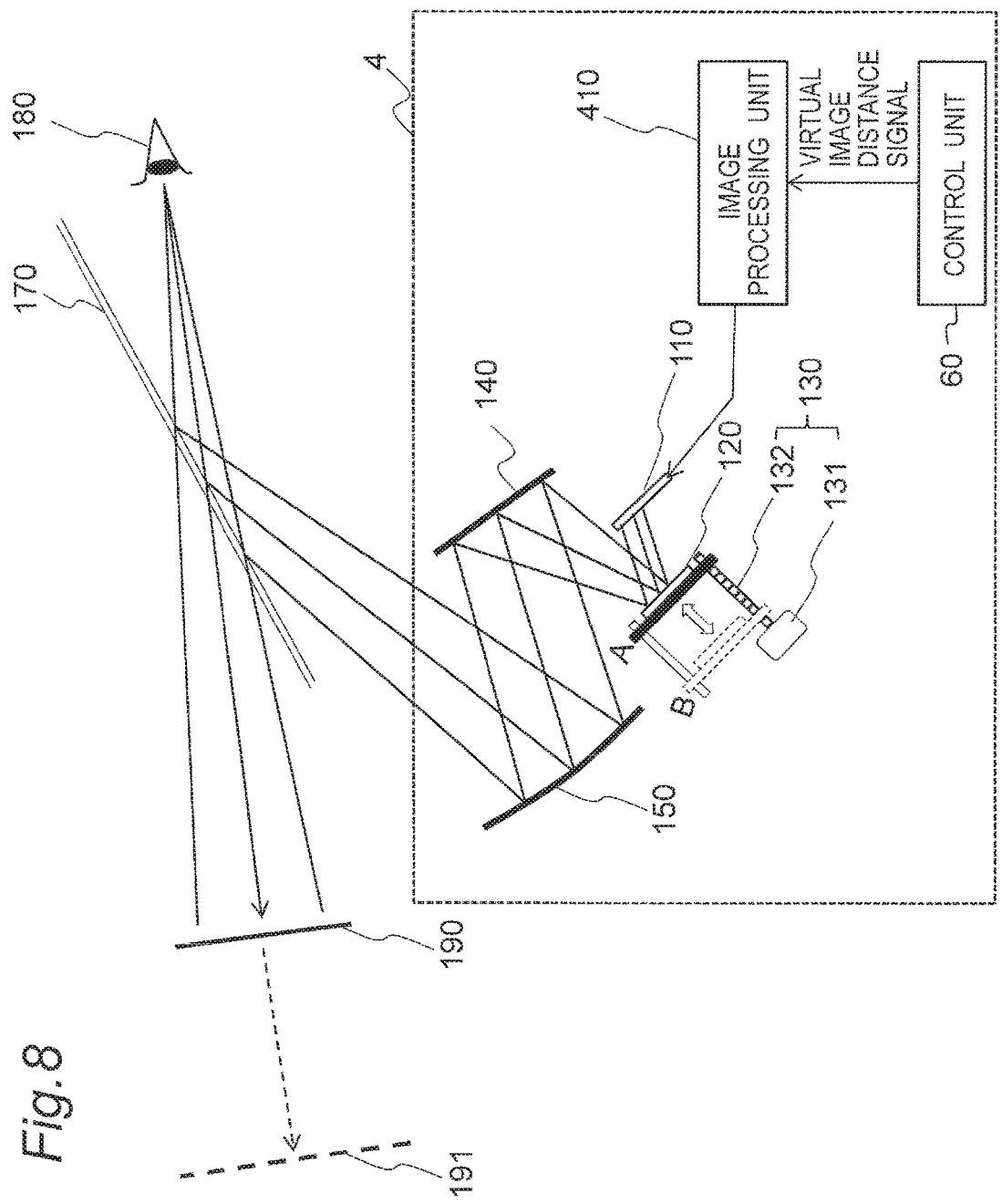
FIG. 8 illustrates an example of a structure of a head-up display device in an embodiment 4 of the present disclosure.

FIG. 8 illustrates an example of a structure of an optical system unit of a head-up display device 4 in an embodiment 4 of the present disclosure. The head-up display device 4 projects light on a front glass 170 of a vehicle.

The head-up display device 4 includes a display element 110 serving as a display, a movable mirror 120 serving as a first optical member, a movable unit 130, a first mirror 140 serving as a second optical member, a second mirror 150, and an image processing unit 410. In FIG. 8, the component same as that of FIG. 3, as well as a component performing the same operation as that of FIG. 3 is designated as the same reference numeral to eliminate duplicated description.

Unlike the embodiment 1, the head-up display device 4 includes the image processing unit 410 for correcting an image or a picture to be displayed in the display element 110. The image processing unit 410 may be provided in the control unit 60 described above, or may be provided along with the control unit 60.

[4-2. Operation]

In the structure of the embodiment 1, a magnification of a projected virtual image, against an image or a picture displayed in the display element 110, is changed in proportion to a virtual image distance. Thus, a field angle of a virtual image visually identified by a driver changes in accordance with change in the virtual image distance. That is, a virtual image at any distance as viewed from a driver changes in apparent size. In addition, changing the virtual image distance changes the amount of distortion aberration caused by a virtual image projecting optical system formed of the first mirror 140 and the second mirror 150.

The distortion aberration distorts a virtual image to cause a substantial size of the virtual image to enlarge or contract, so that the virtual image is further changed in apparent size when a virtual image distance is changed.

Thus, there is a problem in which a virtual image changes in apparent size and in level of distortion when a virtual image distance is changed while the same image or picture is visually identified, to reduce visibility of a virtual image.

The structure of FIG. 8 solves the problems described above. The head-up display device 4 receives a virtual image distance signal in synchronization with location information on the movable mirror 120, and the image processing unit 410 enlarges or contracts an image or a picture to be displayed in the display element 110 in accordance with a virtual image distance indicated by the virtual image distance signal. The virtual image distance signal is created by the control unit 60 on the basis of the amount of movement of the movable mirror 120, or the amount of adjustment of a projection distance of the virtual image. This enables a size of the virtual image at any distance as viewed from a driver to be constant even if the virtual image distance changes.

The aforementioned distortion of a virtual image, caused by change in a virtual image distance, can be corrected by intentionally distorting an image or a picture to be displayed in the display element 110 in a direction opposite to the distortion of the virtual image in accordance with the amount of correction that is previously acquired. Thus, when the image processing unit 410 distorts an image or a picture to be displayed in the display element 110 through the correction described above in response to a virtual image position signal, a shape of a virtual image at any distance as viewed from a driver can be constant, and thus distortion of a virtual image projected can be reduced.

[4-3. Summary]

The head-up display device 4 of the present embodiment includes the image processing unit 410 for correcting an image or a picture to be displayed in the display element 110.

This enables distortion aberration to be reduced while a virtual image is maintained constant in apparent size even if a virtual image distance is changed.

In the present embodiment, the image processing unit 410 adjusts display magnification of a display image such that a virtual image is constant in size even if a virtual image distance is changed. However, the image processing unit 410 may adjust display magnification of a display image such that a virtual image is changed in size in accordance with a virtual image distance. For example, the image processing unit 410 enlarges or contracts an image to be displayed in the display element 110 such that a virtual image decreases in size when a virtual image distance is long and the virtual image increases in size when the virtual image distance is short. As described above, visibility of a virtual image can be increased by using perspective instead of allowing the virtual image to be constant in size.

Embodiment 5

[5-1. Structure]

FIG. 9 illustrates an example of a structure of an optical system unit of a head-up display device 5 in an embodiment 5 of the present disclosure. The head-up display device 5 projects light on a front glass 170 of a vehicle.

The head-up display device 5 includes a display element 110 serving as a display, a movable mirror 120 serving as a first optical member, a movable unit 130, a first mirror 140 serving as a second optical member, a second mirror 150, and a third mirror 510. In FIG. 9, the component same as that of FIG. 3, as well as a component performing the same operation as that of FIG. 3 is designated as the same reference numeral to eliminate duplicated description.

FIG. 9 illustrates a structure in which the third mirror 510 is added to the structure of FIG. 3. This forms a head-up display device provided with an optical system that displays in one device two virtual images each having a different virtual image distance.

The third mirror 510 reflects display light that is not reflected off the movable mirror 120. A position of the third mirror 510 is fixed.

[5-2. Operation]

In FIG. 9, first display light emitted from a part of the display element 110 is reflected off the movable mirror 120, as with FIG. 3, and then is condensed in the first mirror 140 and the second mirror 150. The condensed light is reflected off the front glass 170 to reach driver's eyes 180. The driver's eyes 180 visually identify the first display light, emitted from the display element 110 far ahead of the front glass 170 as a first virtual image 190.

In addition, second display light emitted from another part of the display element 110 is reflected off the third mirror 510, and then is condensed in the first mirror 140 and the second mirror 150. The condensed light is reflected off the front glass 170 to reach the driver's eyes 180. The driver's eyes 180 visually identify the second display light emitted from the display element 110 far ahead of the front glass 170 as a second virtual image 192. The second display light is not reflected off the movable mirror 120.

In FIG. 9, a virtual image distance of the first virtual image can be changed within a range from the virtual image 190 to the virtual image 191 by moving the movable mirror 120 from the position A to the position B. In addition, the second virtual image is displayed at a position of the virtual image 192 regardless of a position of the movable mirror 120.

Accordingly, information to be appropriately displayed at any virtual image distance in a front scene can be displayed as the first virtual image, and information such as speed and warning, which is unnecessary to be superimposed on the front scene, can be always disposed at a fixed virtual image distance as the second virtual image. As described above, a head-up display device capable of displaying two screens can be fabricated.

[5-3. Summary]

The head-up display device 5 of the present embodiment includes the third mirror 510 serving as a third optical member in addition to the structure of the head-up display device 1. The movable mirror 120 reflects a part of the first display light emitted from the display element 110, and the third mirror 510 reflects the second display light being a part of light that is not reflected off the movable mirror 120 in light emitted from the display element 110.

This enables another optical path to be provided for display light emitted from the display element 110. Thus, two virtual images can be simultaneously displayed.

While the first display light and the second display light are emitted from one display element 110 in the present embodiment, a plurality of display elements may be provided so that the first display light and the second display light are emitted from respective different display elements.

In addition, while the third mirror 510 is described based on the premise that its position is fixed, the third mirror 510 may be provided with a movable unit, as with the movable mirror 120, to enable a virtual image distance of the second virtual image to be changed.

While the head-up display device 5 of the present embodiment is formed based on the structure of the head-up display device 1 of the embodiment 1, the third mirror 510 serving as a third optical member may be also provided in the head-up display device of the embodiment 2 or 3. Accordingly, the function same as that of the device described in the present embodiment can be achieved.

Embodiment 6

FIG. 10 is a schematic side view illustrating an example of a structure of a head-up display device 6 in an embodiment 6 of the present disclosure. In FIG. 10, the component same as that of FIG. 3 is designated as the same reference numeral to eliminate duplicated description.

In the embodiment 1 illustrated in FIG. 3, a plane mirror is used as the first mirror 140 in the second optical member. The present embodiment illustrated in FIG. 10 has a structure in which a spherical lens 640 is used as the second optical member, instead of the first mirror 140, so that the structure is different from that of the embodiment 1.

That is, in the present embodiment, the head-up display device 6 includes a display element 110, a movable mirror 120, a spherical surface lens 640, a second mirror 150, and a movable unit 130. The display element 110 emits light to form a display image. The movable mirror 120 first reflects light emitted from the display element 110. The spherical surface lens 640 allows light reflected off the movable mirror 120 to be transmitted therethrough, and the second mirror 150 reflects light reflected off the movable mirror 120, so that the spherical surface lens 640 and the second mirror 150 project a virtual image 190. The movable unit 130 adjusts a position of the movable mirror 120 to adjust a projection distance of the virtual image 190. The movable mirror 120 is disposed at a position such that light that is incident to the movable mirror 120 and is reflected off the movable mirror 120 is non-parallel to a normal L2 of the movable mirror 120 (refer to FIG. 5).

Consequently, a projection optical system can be formed by using a lens instead of the reflection mirror without bending an optical path, for example, so that a head-up display device with a small-sized structure can be provided.

Instead of the spherical lens 640, an aspherical lens, a free-form surface lens, or the like may be used.

In addition, instead of the second mirror 150 in the second optical member, a spherical lens, an aspherical lens, a free-form surface lens, or the like may be used. In this case, the mirror, the lens 640, and the movable mirror 120 are aligned.

Also in the embodiments 2 to 5, a spherical lens, an aspherical lens, a free-form surface lens, or the like may be used instead of the mirror as the second optical member to form a virtual image projecting optical system.

As described above, the embodiments 1 to 6 are described as an example of the art disclosed in the present application. However, the art in the present disclosure is not limited to the embodiments, and is also applicable to an embodiment in which modification, substitute, addition, elimination, or the like is appropriately made to the embodiments. In addition, the components described in the embodiments 1 to 6 can be combined with each other to form an additional embodiment.

The embodiments each are described as an example of the art in the present disclosure. For that, the accompanying drawings and the detailed description are provided.

Accordingly, the components described in the accompanying drawings and the detailed description may include not only an essential component to solve the problem, but also a component that is unnecessary to solve the problem and is described for description of the art. Thus, description of the unnecessary component in the accompanying drawings and the detailed description does not allow the unnecessary component to be directly acknowledged to be essential.

In addition, the embodiments each described above show the art in the present disclosure, for example, so that various modifications, substitute, addition, elimination, or the like can be made within the scope of claims or its equivalent scope.

INDUSTRIAL APPLICABILITY

The head-up display device according to the present disclosure is applicable to a head-up display device in not only a vehicle, but also an aircraft, a train, a vessel, a specific vehicle, and the like.

The invention claimed is:

1. A head-up display device comprising:
a display device that emits light to form a display image;
a first optical member that first reflects light emitted from the display device;
one or more second optical members that reflect or transmit the reflected light of the first optical member to project a virtual image; and
an adjuster that adjusts a position of the first optical member to adjust a projection distance of the virtual image,
wherein the first optical member is positioned such that incident light to the first optical member is non-parallel to a normal of the first optical member, and
wherein the display device shifts a display position of the display image in its display area in accordance with a position of the first optical member.

2. The head-up display device according to claim 1, wherein
the adjuster moves the first optical member in a direction in which a surface distance between the first optical member and the second optical member changes.

3. The head-up display device according to claim 1, wherein
the first optical member is a substantially plane mirror.

4. The head-up display device according to claim 1, wherein
the first optical member is a free-form surface mirror, an aspherical mirror, or a spherical mirror.

5. The head-up display device according to claim 1, wherein
the display includes an illumination member, and
the illumination member shifts an illumination area in accordance with the display position.

6. The head-up display device according to claim 1, wherein
a relationship in the following expression is satisfied, wherein a moving distance of the first optical member is indicated as $\delta d$, an angle formed by a first light beam emitted from the center of a display image displayed in the display device, and a normal of the display device, is indicated as $\phi$, an incident angle of the first light beam to the first optical member is indicated as $\theta$, and a distance of display position shift of a display image in the display device in accordance with movement of the first optical member is indicated as δy $$\delta y = \frac{2\delta d \sin\theta}{\cos\phi}.$$ [Expression 1]

7. The head-up display device according to claim 1, wherein
the display device is disposed such that it emits light toward a predetermined tilted direction from the normal of its display area and the emitted light forms the virtual image, and
the predetermined direction is identical to a direction in which a display position of an image in the display device is shifted to reduce a display distance of the virtual image.

8. The head-up display device according to claim 1, wherein
the adjuster adjusts a projection distance of a virtual image based on the travel location information on a vehicle.

9. The head-up display device according to claim 1, wherein
the adjuster adjusts a projection distance of a virtual image based on the vehicle speed information.

10. The head-up display device according to claim 1, further comprising:
an image processing unit that adjusts the display image,
the image processing unit adjusting display magnification of the display image in accordance with a position of the first optical member.

11. The head-up display device according to claim 1, further comprising:
an image processing unit that adjusts the display image,
the image processing unit correcting image distortion of the display image in accordance with a position of the first optical member.

12. The head-up display device according to claim 1, further comprising:
a third optical member that reflects light emitted from the display device,
wherein the second optical member reflects or transmits the reflected light of the third optical member to project a virtual image different from the said virtual image.

13. A vehicle comprising the head-up display device according to claim 1.

14. The head-up display device according to claim 1, wherein the first optical member is movable with respect to the display device.

15. The head-up display device according to claim 1, wherein a position of the display device is fixed with respect to the first optical member.

* * * * *